US008229227B2

(12) United States Patent
Stojancic et al.

(10) Patent No.: US 8,229,227 B2
(45) Date of Patent: Jul. 24, 2012

(54) METHODS AND APPARATUS FOR PROVIDING A SCALABLE IDENTIFICATION OF DIGITAL VIDEO SEQUENCES

(75) Inventors: Mihailo M. Stojancic, San Jose, CA (US); Jose Pio Pereira, Cupertino, CA (US); Shashank Merchant, Sunnyvale, CA (US)

(73) Assignee: Zeitera, LLC, Mountain View, CA (US)

( * ) Notice: Subject to any disclaimer, the term of this patent is extended or adjusted under 35 U.S.C. 154(b) by 1071 days.

(21) Appl. No.: 12/141,163

(22) Filed: Jun. 18, 2008

(65) Prior Publication Data

US 2008/0310731 A1    Dec. 18, 2008

Related U.S. Application Data

(60) Provisional application No. 60/944,643, filed on Jun. 18, 2007.

(51) Int. Cl.
*G06K 9/46* (2006.01)
(52) U.S. Cl. ............ 382/190; 382/181; 382/224
(58) Field of Classification Search .......... 382/181, 382/190, 231
See application file for complete search history.

(56) References Cited

U.S. PATENT DOCUMENTS

| | | | | |
|---|---|---|---|---|
| 6,298,144 B1 * | 10/2001 | Pucker et al. | ............ | 382/103 |
| 6,574,378 B1 * | 6/2003 | Lim | ............ | 382/305 |
| 7,921,296 B2 * | 4/2011 | Haitsma et al. | ............ | 713/180 |
| 2007/0188336 A1 * | 8/2007 | Privalov | ............ | 340/628 |
| 2007/0274537 A1 * | 11/2007 | Srinivasan | ............ | 381/94.3 |
| 2007/0297645 A1 * | 12/2007 | Pace | ............ | 382/103 |
| 2008/0226173 A1 * | 9/2008 | Yuan et al. | ............ | 382/190 |

OTHER PUBLICATIONS

Dohring, et al., "Fast and Effective Features for Recognizing Recurring Video Clips in Very Large Databases", International Workshop on Video and Multimedia Digital Library, Sep. 11-13, 2007, Modena, Italy, pp. 65-70.
Haitsma, et al., "Robust Audio Hasing for Content Identification", Workshop on content Based Multimedia and Indexing, Brescia, Italy, 2001.
Venkatescan, et al., "Robust Image Hashing", IEEE International Conference on Image Processing, Vancouver, Canada, Sep. 2000, pp. 664-666.
A. Massoudi, et al., "A Video Fingerprint Based on Visual Digest and Local Fingerprints", Image Processing, 2006 IEEE International Conference, Oct. 8-11, 2006, pp. 2297-2300.
Joly et al., "Statistical Similarity Search Applied to Content-Based Video Copy Detection", 21st International Conference on Data Engineering Workshops, 2005, p. 1285.
Felzenszwalb et al., "Efficient Graph-Based Image Segmentation", International Journal of Computer Vision, vol. 59, No. 2, Sep. 2004.

(Continued)

*Primary Examiner* — Bhavesh Mehta
*Assistant Examiner* — Edward Park
(74) *Attorney, Agent, or Firm* — Law Offices of Peter H. Priest, PLLC

(57) ABSTRACT

Scaleable video sequence processing with various filtering rules is applied to extract dominant features, and generate unique set of signatures based on video content. Video sequence structuring and subsequent video sequence characterization is performed by tracking statistical changes in the content of a succession of video frames and selecting suitable frames for further treatment by region based intra-frame segmentation and contour tracing and description. Compact representative signatures are generated on the video sequence structural level as well as on the selected video frame level, resulting in an efficient video database formation and search.

19 Claims, 15 Drawing Sheets

OTHER PUBLICATIONS

B. Sumengen, et al., "Fast and Adaptive Pairwise Similarities for Graph Cuts-Based Image Segmentation", Computer Vision and Pattern Recognition Workshop, Jun. 17-22, 2006, p. 179.

L. Zheng, et al., Direct Fingerprinting on Multicasting Compressed Video, pp. 76-83, 11th International Multimedia Modelling Conference, 2005.

* cited by examiner

METHODS AND APPARATUS FOR PROVIDING A SCALABLE IDENTIFICATION OF DIGITAL VIDEO SEQUENCES

CROSS REFERENCE TO RELATED APPLICATION

The present application claims the benefit of U.S. Provisional Patent Application No. 60/944,643 entitled "Methods and Apparatus for Providing a Scalable Identification of Digital Video Sequences", filed on Jun. 18, 2007 which is hereby incorporated by reference in its entirety.

The patent application entitled "Method and Apparatus for Multi-dimensional Content Search and Video Identification" filed on Jun. 18, 2008, and having the same assignee as the present application is a related application and hereby incorporated by reference.

FIELD OF THE INVENTION

The present invention relates generally to improvements in video processing architecture for feature extraction from a digital video sequence. More particularly, the present invention addresses methods and apparatuses for video sequence structuring, subsequent video sequence characterization, and efficient signature generation for large video database indexing and search.

BACKGROUND OF THE INVENTION

Video applications which include video database browsing and identification will have explosive growth over the next a few years. To address this growth, there is a need for a comprehensive solution related to the problem of the indexing of a video sequence database and the identification of particular video sequences within that database. Major applications include large video database mining and identifying similar videos for the purpose of copyright protection, advertising and surveillance. Due to the large size of such databases and the density of video files, high performance video identification/search technology is needed. Robust video content identification and copyright protection should be resistant to any intentional or unintentional video content change/distortion, and the design should be scalable and capable of handling very large video databases and long video sequences.

Increasing demand for such solutions, which include standard definition (SD) and high definition (HD) formats of video, requires increasing sophistication, flexibility, and performance in the supporting algorithms and hardware. The sophistication, flexibility, and performance requirements exceed the capabilities of current generations of software based solutions, in many cases, by an order of magnitude.

SUMMARY OF THE INVENTION

In one or more of its several aspects, the present invention recognizes and addresses problems such as those described above. One embodiment of the invention addresses a method for content based video sequence identification. Active regions are determined in frames of a video sequence. A set of video frames are selected in response to temporal statistical characteristics of the determined active regions. Video features are extracted from the selected video frames. Multi-dimensional content based signatures are generated based on the extracted video features that identify the video sequence.

Another embodiment of the invention addresses a method for content based video database formation. A video sequence is processed by video frame filtering, temporal statistic collection, and frame selection to produce analysis results. Active video frame areas are selected based on the analysis results. Video frames are segmented utilizing the selected active frame areas into regions delineated by computed contours. The computed contours are traced to produce a vector of contiguous spatial coordinates for each video frame. Each vector of contiguous spatial coordinates is processed to provide a contour pixel gradient vector orientation and magnitude for selected contours. A signature is generated for each selected contour based on the contour pixel gradient vector orientation and magnitude. A content based video database is formed to hold the signatures which are based on the content of the video sequence.

Another embodiment of the invention addresses a method for video sequence structuring. Mean absolute value of difference (MAD) values are computed for video frame active regions in a succession of video frames in a sequence of video frames. A temporal statistical function $f_0(n)$ is generated in response to the MAD values, the $f_0(n)$ function is a time series with its samples having identical values as the MAD values. The video sequence is partitioned with a programmable size sliding window into multiple spatial partitions. A starting point of the programmable size sliding windows is attached to local extrema $f_0(n)$ values of the previous programmable size sliding window. Video frames within each programmable size sliding window are selected at the position of the local extrema $f_0(n)$ values. The selected video frames are segmented into areas of similar light intensity and color having image contours. The contours are processed to extract features of the selected video frame to identify the video sequence to be held in a signature database.

These and other features, aspects, techniques and advantages of the present invention will be apparent to those skilled in the art from the following detailed descriptions taken together with the accompanying drawings and claims.

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer-usable storage medium having computer-usable program code embodied in the medium. Any suitable computer readable medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C++, JAVA®, Smalltalk, JavaScript®, Visual Basic®, TSQL, Perl, use of .NET® Framework, Visual Studio®, or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A computer-readable storage medium may be coupled to the processor through local connections such that the processor can read information from, and write information to, the storage medium or through network connections such that the processor can download information from or upload information to the storage medium. In the alternative, the storage medium may be integral to the processor.

Figure 1:
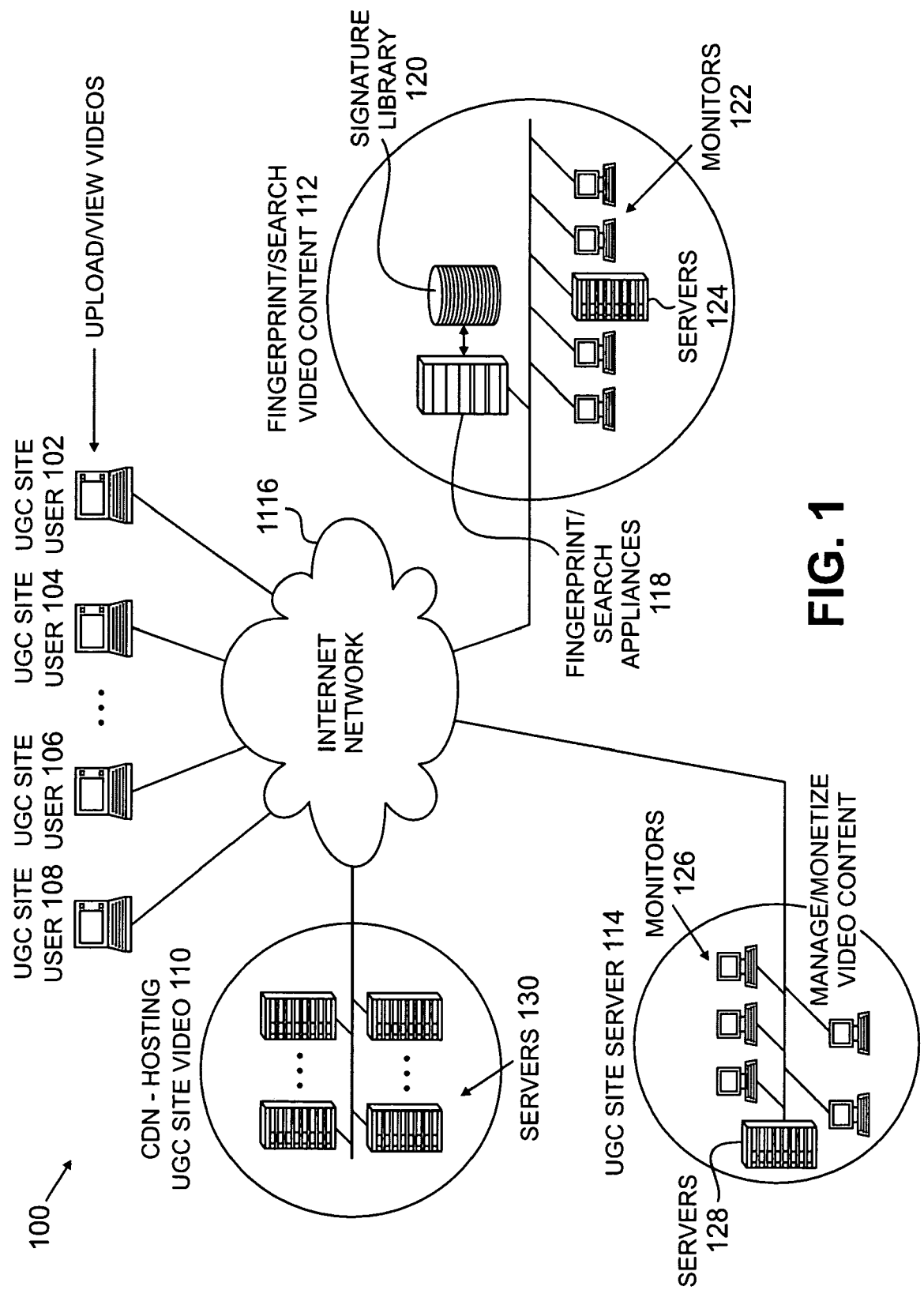
FIG. 1 illustrates an Internet networking system for content based video fingerprinting and identification in accordance with an embodiment of the present invention.

FIG. 1 illustrates a system 100 for both video fingerprinting and identification, and video content based management in accordance with an embodiment of the present invention. This approach targets user generated content (UGC) Internet Web sites. User sites 102-108 generate user video content which is uploaded to a UGC Internet Web company where it may be stored in a server and storage subsystem 128. Alternatively, the video content may be redirected to a third party server system providing service to the UGC Internet Web company. For example, third party server system 110 with an array of servers 130 hosts user generated video content and provides service to the UGC Internet Web company with UGC site server system 14, with their servers and storage subsystem 128 and monitors 126. A video fingerprinting and video identification system 112 utilizes a video fingerprinting and search appliance 118, a video database 120 containing a signature library, and servers 124 with user terminal/monitors 122. The Internet network 116 allows for remote system location interconnect and information exchange and management.

The video fingerprinting and video identification system 112 in FIG. 1 is scalable and utilizes highly accurate video fingerprinting and identification technology that checks unknown video content against a database of previously fingerprinted video content, which is considered an accurate or "golden" database. The video fingerprinting and video identification system 112 is different from commonly deployed systems in that it extracts features from the video itself and does not rely on a hash of a file, metadata or the audio stream that accompanies a video. The video fingerprinting and video identification system 112 allows a UGC site server system 114 to configure a "golden" database specific to its business requirements. A self-contained video fingerprinting and search appliance 118 that is configured to sit on the Internet network 116 within the fingerprinting and video identification system 112, compares video streams against a database of signatures in the video database 120, that has been previously generated. The video fingerprinting and search appliance 118 allows a UGC site server system 114 to automatically flag multiple copies or reoccurring versions of popular uploads, automatically flag content previously identified for removal, as well the content identified under a take-down notice, content not appropriate for a site, such as inappropriate, violent, racist, or the like content, and correlate results from other filtering methods, allowing a much higher overall accuracy than found with existing technologies.

Each of the appliances and servers, 118, 124, 128, and 130 may include a processor complex having one or more processors, having internal program storage and local user controls such as a monitor, a keyboard, a mouse, a printer, and may include other input or output devices, such as an external file storage device and communication interfaces. The video fingerprinting and search appliance 118 may store programs such as a program implementation of a content based video identification process of the present invention or have access to such programs through electronic media, such as may be downloaded over the Internet from an external server, accessed through a universal serial bus (USB) port from flash memory, accessed from disk media of various types, or the like.

The video fingerprinting and search appliance 118 has access to the video database 120 which may be accessed by software programs operating from the appliance 118, for example. The video database 120 may store the video archives, as well as all data related to inputs to and outputs from the video fingerprinting and video identification system 112, and a plurality of video fingerprints that have been adapted for use as described herein and in accordance with the present invention. It is noted that depending on the size of an installation, the functions of the video fingerprinting and search appliance 118 and the management of the video database 120 may be combined in a single server running separate program threads for each function.

The video fingerprinting and video identification system 112 may also suitably include one or more servers 124 and user terminals/monitors 122. Each of the user terminals/monitors 122 and the video fingerprinting and search appliance 118 may be connected directly to the server 124 or indirectly connected to it over a network, such as a local cabled intranet, wireless intranet, the Internet, or the like.

The video fingerprinting and search appliance 118 may comprise, for example, a personal computer, a laptop computer, or the like. The user terminals/monitors 122 may comprise a personal computer equipped with programs and interfaces to support data input and output and fingerprinting and search monitoring that may be implemented both automatically and manually. The user terminals/monitors 122 and video fingerprinting and search appliance 118 may also have access to the server 124, and may be accessed from the server 124.

One of the user terminals/monitors 122 may support a graphical user interface utilized to setup the fingerprinting parameters and present the search results. These terminals may further provide miscellaneous administrative functions such as user log-on rights, change of user permissions and passwords, and the like.

Figure 2:
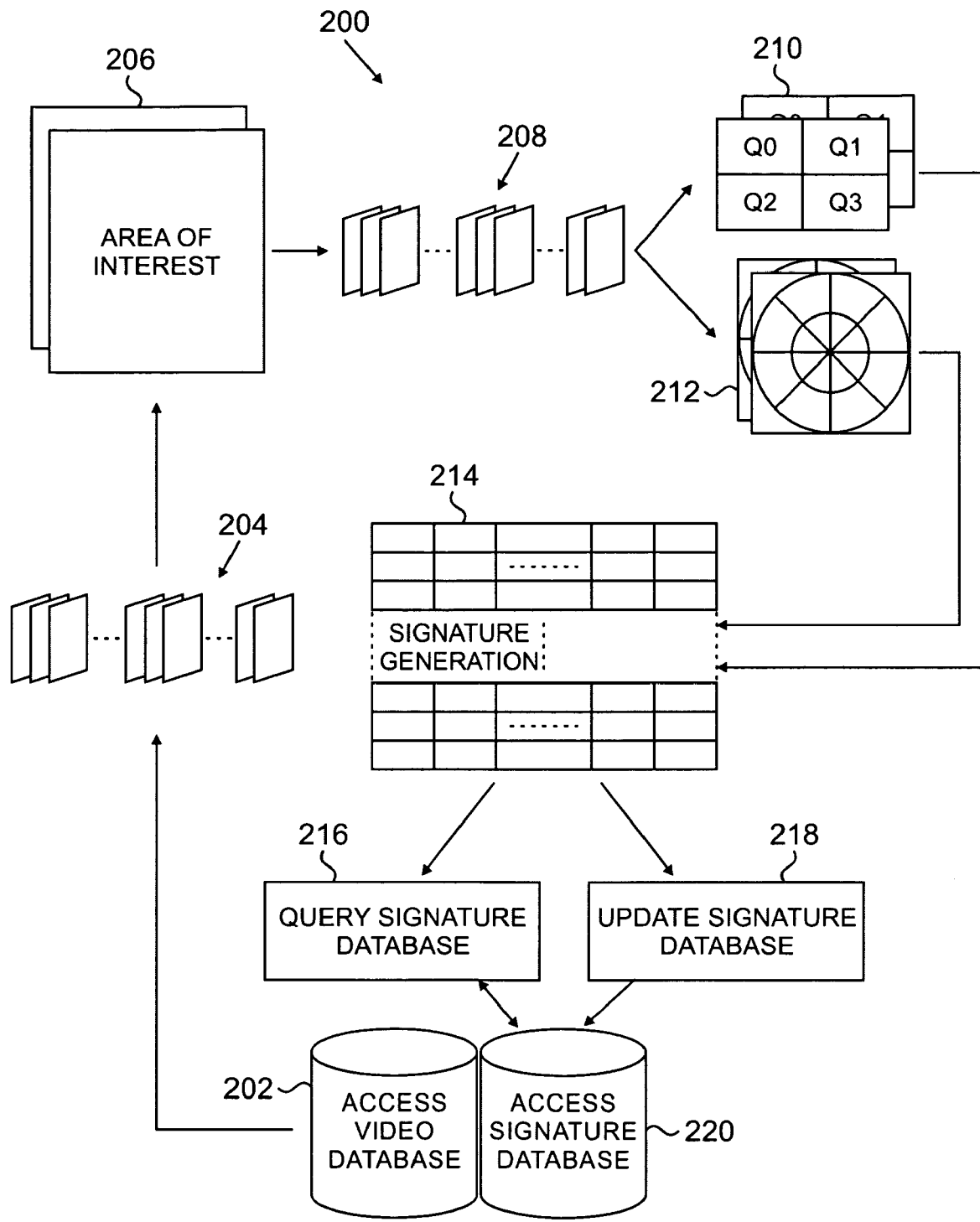
FIG. 2 illustrates a process for content based video feature extraction, signature generation, and database formation and search in accordance with an embodiment of the present invention.

FIG. 2 illustrates a process 200 for content based video feature extraction, signature generation, and database formation and search. For use herein, a video sequence is defined as a plurality of video frames presented sequentially in time. As shown in FIG. 2, the basic functionality of a video sequence signature (fingerprint) database formation consists of selecting a video sequence 204 from a video database in access step 202, and processing the video sequence in a series of process steps 206, 208, 210, 212, 214, and 218 as follows. An analysis process step 206 includes processing a video sequence by video frame filtering for noise reduction and desired active region determination for each video frame as described in more detail below. A temporal statistics and suitable frame selection process step 208 includes temporal statistics collection and selection of a set of video frames for further processing, as described in more detail below with regard to the flowchart 1200 of FIG. 12. A temporal signature generation process step 210 is described in more detail below with regard to the flowchart 1300 of FIG. 13. A spatial video frame analysis process step 212 includes segmentation of the active video frame area into regions of similar light intensity and color, determining the perimeter of segmented regions which represent closed contours, and contour tracing to produce a vector of contiguous spatial (x, y) coordinates for each pixel on the contour under consideration, as described in flowchart 1400 of FIG. 14.

The spatial video frame analysis process step 212 further includes processing of contour pixels to produce robust descriptors, as described in more detail below in flowchart 1500 of FIG. 15. A signature generation process step 214 derives multi-dimensional signatures (fingerprints) of compact size, as described in more detail below with regard to signature generation flowchart 1600 of FIG. 16. An update process step 218 is utilized to insert a set of compact signatures into the signature database in access step 220 to be used for video sequence search and identification, as described in more detail below with regard to search and video identification flowchart 1700 of FIG. 17.

As the output of the above processing, a number of results are presented including the count of similar videos found, the count of correct videos identified, the count of faulty identifications, as well as other statistics with respect to precision and accuracy of the video identification process.

Figure 17:
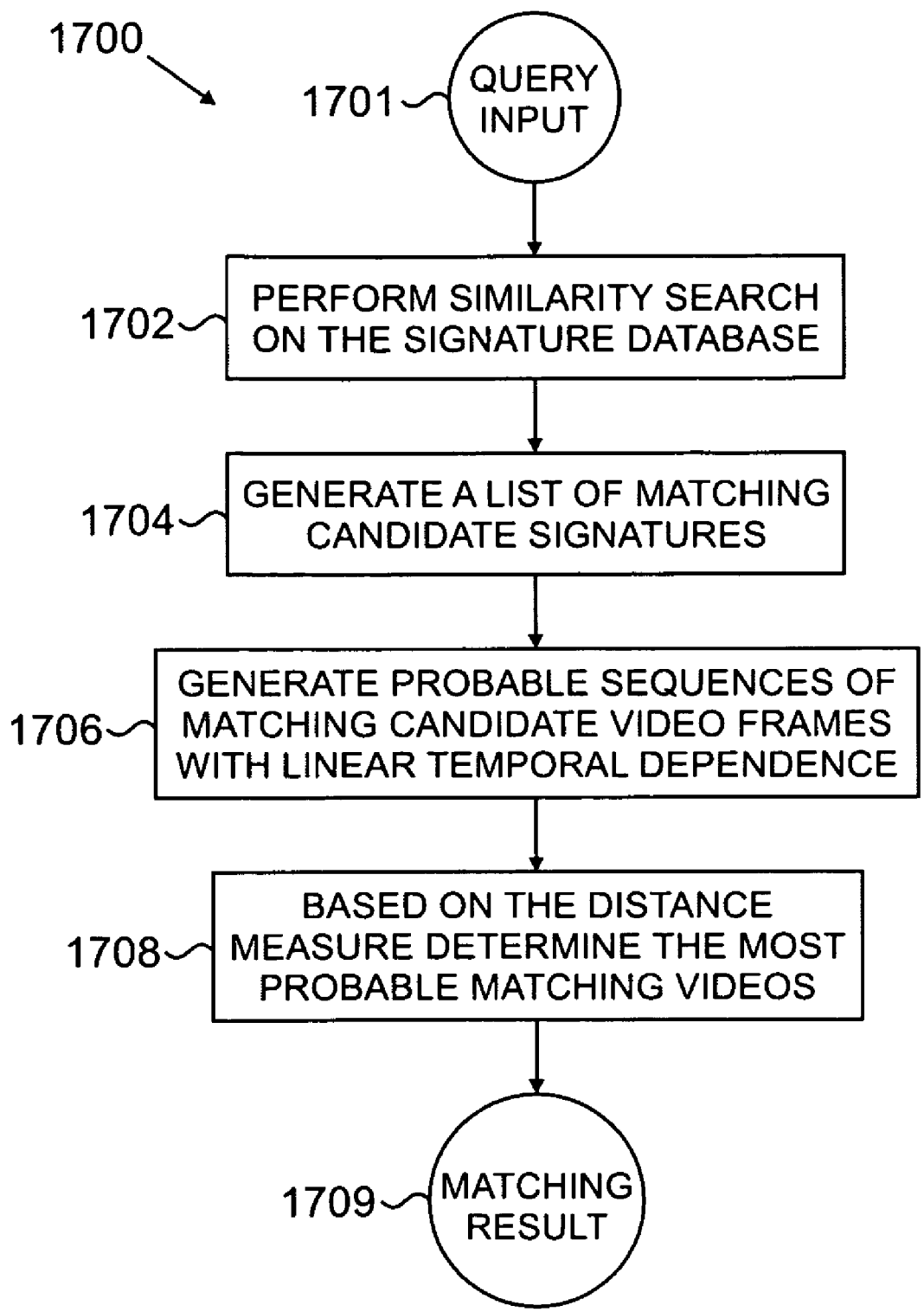
FIG. 17 illustrates a flowchart for signature database query and matching video sequence determination in accordance with an embodiment of the present invention.

A similar process is followed in the video sequence search/identification process. A compressed or raw video sequence to be identified is provided, for example, from a video database in access step 202 and processed in a series of process steps 204, 206, 208, 210, 212, 214, and 216. The query process 216 includes processing to deliver a set of videos closely matching the original one, as shown in the flowchart of FIG. 17 and described in more detail below.

The active region of a video frame is determined by examining the frame horizontal and vertical boundaries with respect to the total normalized average brightness of the frame. For every horizontal top and bottom line of pixels and vertical left and right line of pixels of a video frame, a normalized average brightness level is computed and then compared to the total normalized average brightness for the entire frame. If the normalized average brightness for a line of pixels is below a certain percentage of the total normalized average brightness for the frame that line is skipped. This process is continued starting from the outermost boundary of the frame until a region is reached where no normalized average brightness for a line is less than the given percentage of the total normalized average brightness for the frame.

In one aspect of the present invention, a method is described for video sequence structuring in the time domain and subsequent video frame selection for further processing in the spatial domain, The frame selection process is based on the statistical behavior of the video frame progression in the time domain.

A one-dimensional temporal statistical function is derived from the succession of video frames in a video sequence based on the mean absolute value difference ($MAD_n$) parameter computed for each pair of frames in time succession as $$MAD_n (\Sigma abs(p_n - p_m))/P, \quad (1)$$

where "$p_m$" and "$p_n$" are corresponding pixels in two successive frames, "n" and "m" denote the n-th and the m-th frames in time succession, and "p" is the number of pixels in a video frame. The summation is performed over all pixels in a video frame.

Given the set of $MAD_n$ values, a temporal statistical function $f_0(n)$ is defined as a time series with its samples at n=0, 1, 2, 3, ..., N, time (frame) positions having identical values as the MAD$_n$, n=0, 1, 2, 3, ..., N, parameter computed for the corresponding frames in the video sequence with N frames.

The function f$_0$(n) is filtered with a median filter to suppress excessive peaks due to abrupt scene changes and also to suppress very low values due to undesired video frame repetitions. Subsequently, the f$_0$(n) is windowed with a flexible overlapping window process in order to select video frames for further processing.

The overlapped windowing is performed with a sliding rectangular window (time window) encompassing a number of f$_0$(n) samples which are in direct correspondence with the video sequence frames in time succession. Each timing window is positioned with the starting point attaching alternatively onto extrema points, a minimum point first and then a maximum point which are determined for the set of f$_0$(n) samples covered by the previous position of the timing window. The frame for further spatial processing is selected precisely at the selected starting point of each time window. This process is continued until the end of the video sequence is reached, producing a number of selected video frames used for spatial analysis and spatial signature or fingerprint generation.

Figure 3:
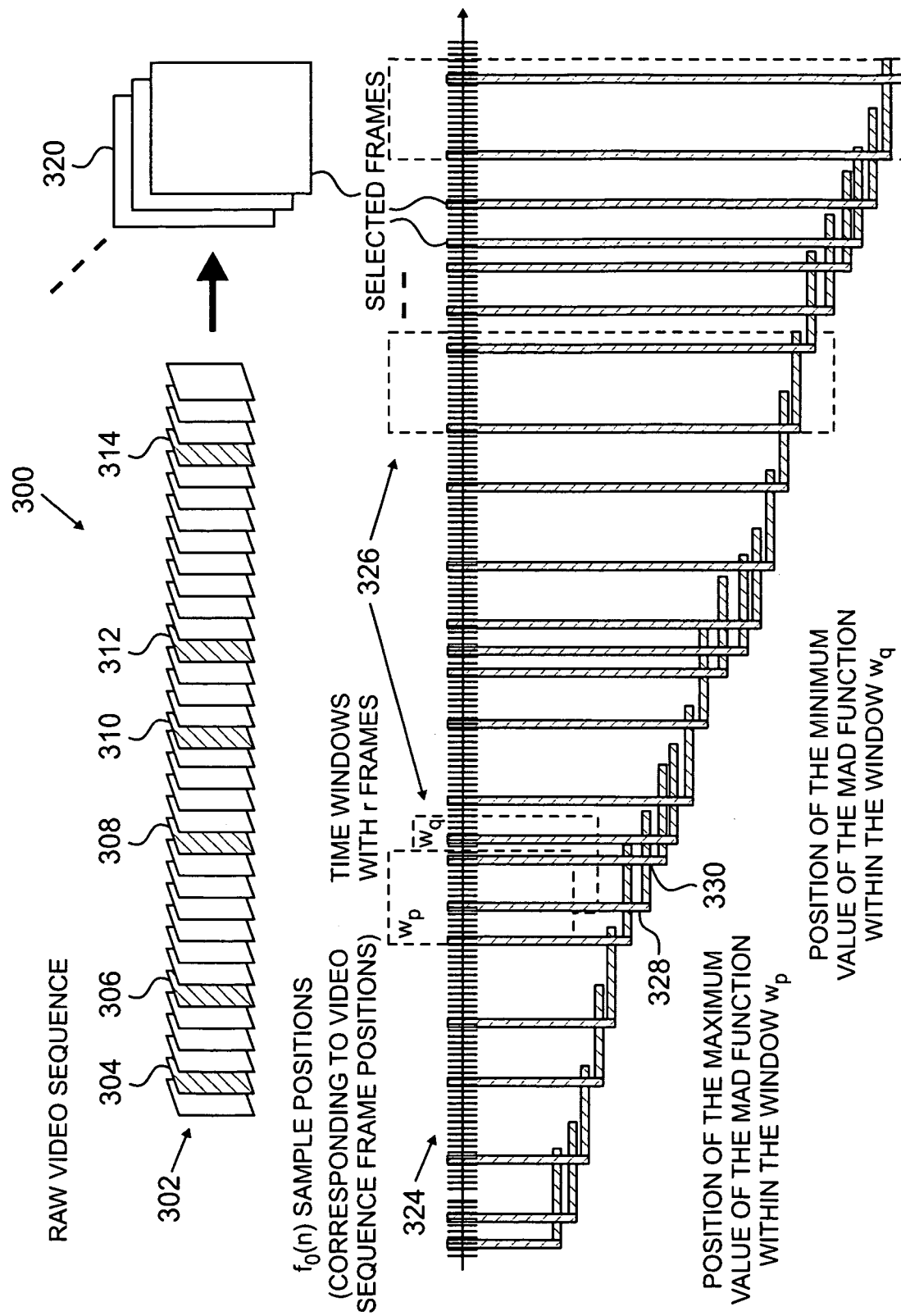
FIG. 3 illustrates an exemplary digital video sequence structuring and temporal feature extraction for temporal content based signature generation and frame selection in accordance with an embodiment of the present invention.

FIG. 3 illustrates an exemplary digital video sequence structuring and feature extraction process 300 for temporal content based signature generation and video sequence frame selection in accordance with an embodiment of the present invention. In particular, inter-frame statistics collection is used for the temporal statistical unction generation and the temporal signature generation.

Raw video sequences 302 and 324 are divided into overlapping regions based on a programmable size sliding time windows, such as sliding time windows 326 each encompassing a number of video frames. Within each time window a single frame is selected, such as, for example, one of the following frames 304-314, for further spatial processing. For the particular example presented here, this selection is accomplished by alternatively determining the maximum value position 328 and then the minimum value position 330 of the f$_0$(n) function values corresponding to the contiguous overlapping time windows, for example w$_p$ and w$_q$ shown in FIG. 3.

Figure 11:
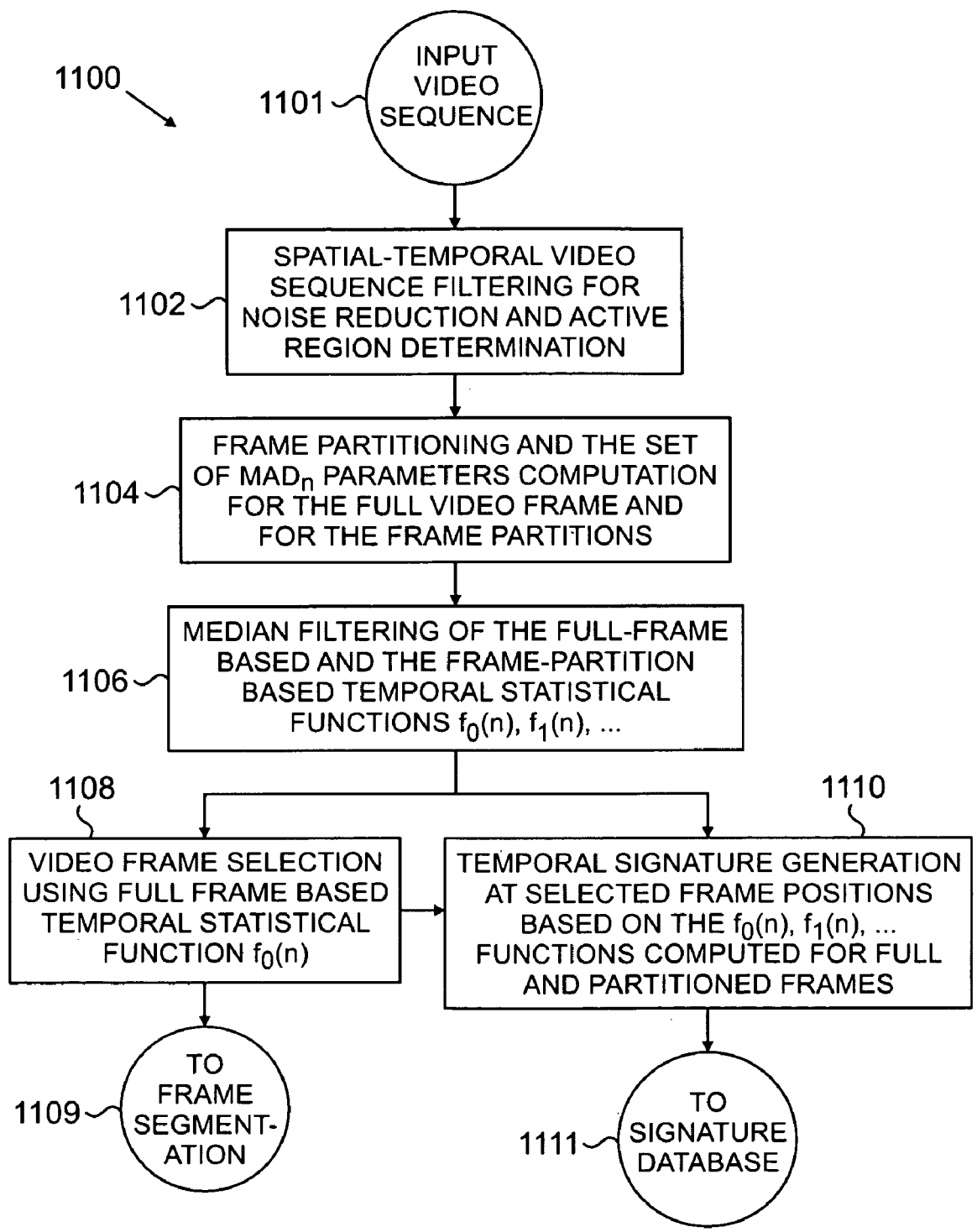
FIG. 11 illustrates a flowchart for video sequence preprocessing and feature extraction processing for temporal signature generation and frame selection in accordance with an embodiment of the present invention.

Within each time window, a frame κ is selected for further processing, such as one of the frames 320, at the position of local maximum value or alternately the position of local minimum value of the f$_0$(n) for the time window in question. The frame κ, representing a pivot frame for the given time window, will be used as a starting frame for the formation of the next time window. The same frame κ will also be selected for further processing in spatial signature generation. The above process is illustrated in the flowchart of FIG. 11.

Figure 10:
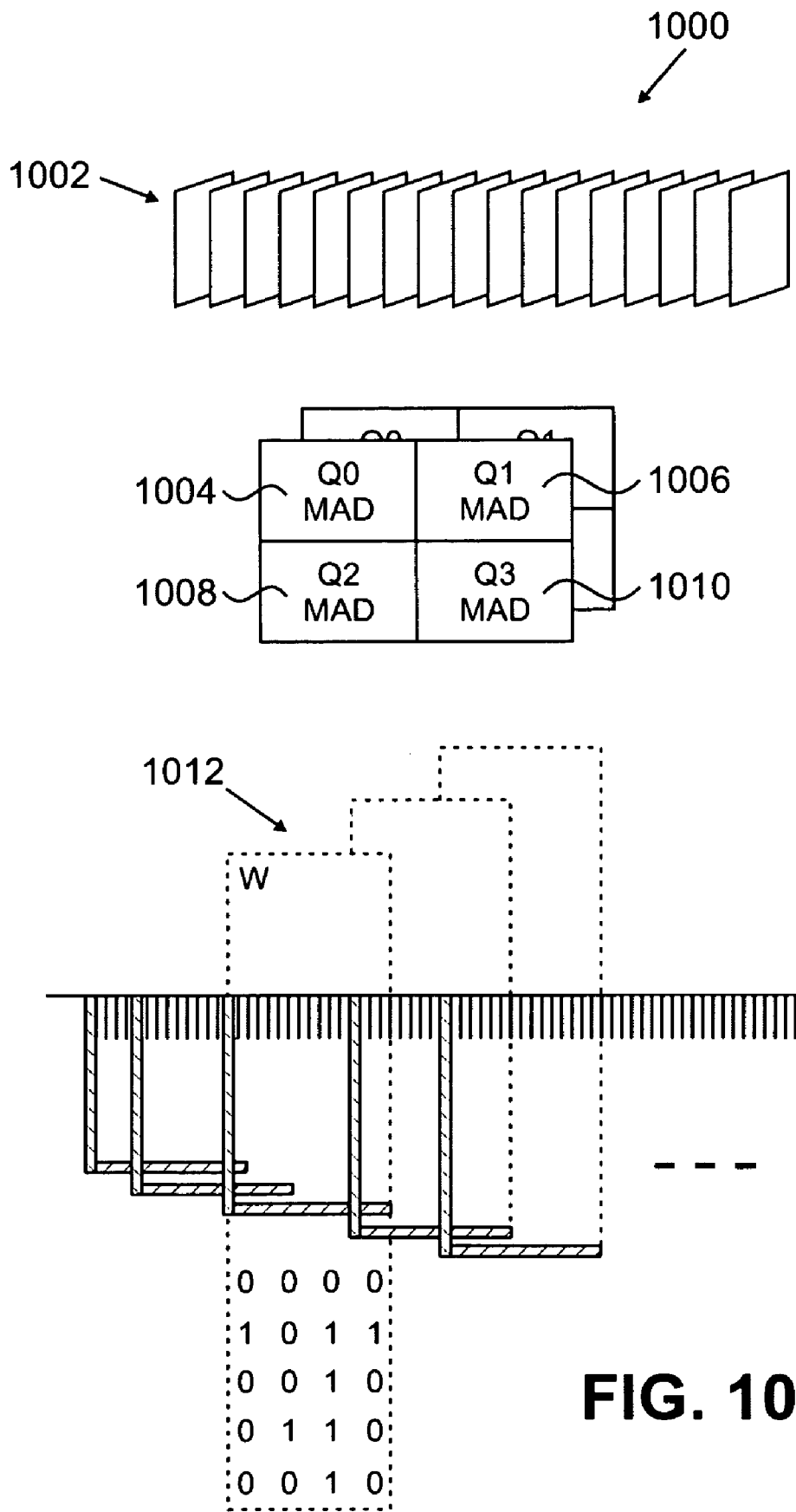
FIG. 10 illustrates an exemplary 20-bit temporal signature generation in accordance with an embodiment of the present invention.

In addition to temporal partitioning of a video sequence, each video frame is subdivided into multiple sub-frames of programmable size as shown in FIG. 10, and a normalized MAD parameter between successive frames is computed in time progression direction for each sub-frame partition. Based on the MAD parameter computed for each pair of video frames, a temporal statistical function f$_0$(n) is formed as a time series for each partition and in a manner identical to formation of the function f$_0$(n) above. In the following text, the method of generating a temporal signature will be explained by an example, where the video frames 1002 are each divided into four quadrants 1004-1010, and consequently four additional temporal statistical functions f$_1$(n), f$_2$(n), f$_3$(n), and f$_4$(n) are formed based on the QMAD parameters for each frame quadrant q=0, 1, 2, and 3 1004-1010, respectively, and computed according to $$QMAD_n = (\Sigma abs(p_n - p_m))/Q, \quad (2)$$

where "p$_m$" and "p$_n$" are corresponding pixels in two successive frames within a partition (quadrant), "n" and "m" denote the n-th and the m-th frames in time succession, and "Q" is the number of pixels in one frame quadrant. The summation is performed over all pixels in a quadrant.

Based on the QMAD$_n$ set computed for each quadrant, four time series functions f$_1$(n), f$_2$(n), f$_3$(n), and f$_4$(n) are formed following the full frame function f$_0$(n) example described above. Four MN$_q$ parameters 1012 are computed for a time window, one for each quadrant, as a normalized sum according to $$MN_q = \Sigma f_q(n)/F, \quad (3)$$

where q∈{1, 2, 3, 4}, F is the number of frames within the time window, and the summation is performed over the set of time window frames. The MN$_q$ values are subsequently used as threshold parameters for each quadrant and associated time window to generate a temporal signature.

In order to generate four signature bits for each quadrant, the time window is partitioned into four partitions and a normalized sum of f$_q$(n) is computed for each time partition and each quadrant according to $$MPN^q_{p0} = \Sigma_{p0} f_q(n)/F_{p0},$$

$$MPN^{qp1} = \Sigma_{p1} f_q(n)/F_{p1},$$

$$MPN^q_{p2} = \Sigma_{p2} f_q(n)/F_{p2},$$

$$MPN^q_{p3} = \Sigma_{p3} f_q(n)/F_{p3}, \quad (4)$$

where subscripts $_{p0}$, $_{p1}$, $_{p2}$, $_{p3}$ denote four time window partitions, q∈{1, 2, 3, 4} denotes 4 quadrants, F$_{p0}$, F$_{p1}$, F$_{p2}$, and F$_{p3}$ denote the number of frames in each time partition, and the summation is performed over the set of frames in each time partition.

For this particular example, for each quadrant and each time window a 4-bit signature is derived by comparing the MN$_q$ of eq. (3) with the corresponding time partition values MPN$_{p0}^q$, MPN$_{p1}^q$, MPN$_{p2}^q$, MPN$_{p3}^q$, and a 0 or 1 is assigned depending on whether the particular MN$_q$ value is greater than or less than the corresponding MPN$_{pi}^q$ value.

In addition to four 4-bit signatures for partitioned frames, a 4-bit signature is derived following the same procedure but based on the f$_0$(n) function formulated for the entire frame. A collection of five 4-bit values 1012 that are computed for the entire frame and each quadrant within an r-frame time window represents a 20-bit signature to be attached to the selected frame κ for this window.

In general, for the case of T time window partitions and S intra-frame partitions a temporal signature size extends to (T*S)+T bits. This process of temporal signature generation is described in the flowchart of FIG. 13.

Selected frames, output of the process step 208 in FIG. 2, are segmented in the segmentation and contour tracing process step 212 of FIG. 2, which includes contour tracing, contour invariant description, and contour pixel gradient vector computation.

Image segmentation into distinct regions, as applied here in process step 212, determines boundaries between connected regions based on a graph representation of the contents of a video frame. Image segmentation is performed based on selecting edges from a graph, where initially each image pixel corresponds to a graph vertex, and certain neighboring pixels are connected by undirected edges. Weights on each edge, that are derived based on the pixel intensity level, color code, or other such criteria, measure the similarity and dissimilarity between pixels. The technique used here in process step 212 adaptively adjusts the segmentation criterion, such as graph edge weights, based on the degree of variability in neighboring regions of the image to establish a boundary between two regions by comparing intensity differences across the boundary, and the intensity differences between neighboring pixels within each region. For color images, the algorithm may run three times, once for each of the red, green and blue color planes, and then an intersection of these three sets of components is used to form the final region. A threshold parameter is used to compute a threshold function. A larger threshold causes a preference for larger segmented regions. An algorithm for automatic threshold parameter computation may be used, to adjust the threshold value to the current video frame activity measure. Also, an object size parameter is selected, to allow regions considered too small to be encapsulated into larger regions, effectively controlling the number of segmented regions created as a result.

As a post-segmentation step, closed contours enclosing segmented regions are traced and the contour coordinates (x, y) are stored in separate arrays for further treatment related to the intra-frame spatial signature generation step in process step 212. A set of the most suitable contours for further processing may be selected based on various criteria that include, but are not limited to, size, position, orientation, smoothness, gradient vector intensity and phase angle computed for each contour pixel with respect to the surrounding area.

Multiple criteria have been developed to identify and select prominent contours that have better survivability under various video distortions which may be imposed on a query video sequence. These criteria include, but are not limited to, normalized intensity gradient (NIG) computed for each closed contour pixel, and normalized gradient phase angle or orientation energy (EOG) computed for each contour pixel with respect to the surrounding area.

Figure 4:
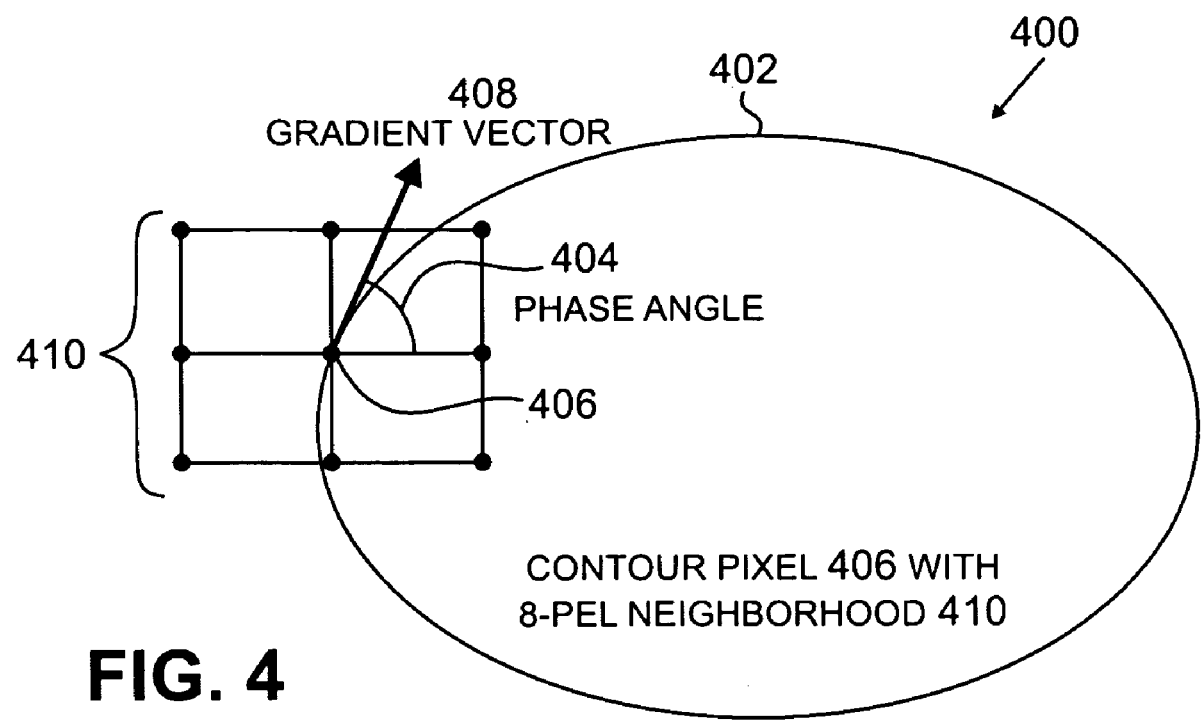
FIG. 4 illustrates an intensity gradient and orientation (phase angle) graph in accordance with an embodiment of the present invention.

The method of computing the NIG parameter for a contour and subsequent selection of contours, or contour traces, based on this criterion will be described next. FIG. 4 illustrates an intensity gradient and orientation graph 400 with an arbitrary contour 402 and an intensity gradient vector 408 with an orientation, or phase angle 404 computed for each contour pixel 406 based on an 8-pixel neighborhood 410.

The arbitrary contour 402 is derived from the segmentation process 212, FIG. 2, with a contour pixel 406 at position (x, y) and its 8-pixel neighborhood 410. An intensity gradient vector [G(x), G(y)] 408 for the contour pixel f(x, y) 406 is computed as a two dimensional derivative $$[G_x(x), G_y(y)] = [\partial f(x,y)/\partial x, \partial f(x,y)/\partial y] \quad (5)$$

Figure 5:
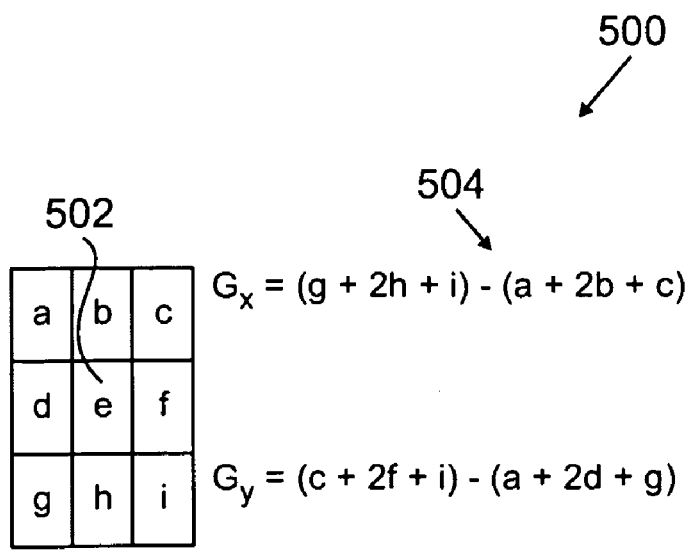
FIG. 5 illustrates an example of a pixel intensity gradient approximation technique based on 8-neighbor pixels in accordance with an embodiment of the present invention.

The 2D derivative computation of equation 5 is approximated with the operator 504 presented in FIG. 5, where the contour pixel f(x, y) 406 of FIG. 4 is positioned at point "e" 502 of FIG. 5.

Based on the approximated values $G_x$ and $G_y$, the gradient vector intensity for a single pixel is computed as $$G_p = \sqrt{[G_x^2 + G_y^2]}. \quad (6)$$

For the entire contour, the normalized intensity gradient is computed according to $$NIG_c = (1/L)\Sigma_p G_p, \quad (7)$$

where L is the number of contour pixels,

After the NIG parameters are computed according to equation (7) for all contours, or separately for a multitude of contour traces, produced by the segmentation step 212 of FIG. 2, they are sorted in decreasing order and a direct correspondence between a sorted NIG array (not shown) and the originating contours, contour traces, is established. Next a threshold parameter is introduced which may be used to prune the set of existing contours, or contour traces, by discarding those with NIG values below the given threshold. The thresholding parameter, producing the number of contours to be discarded, for example, is based on the sum of lower NIG values up to the desired percentage of the total NIG sum for the subject video frame.

While the NIG parameter is in general used to select contours with higher overall intensity gradient, it may readily be used on partial traces of any given contour in order to select those traces with higher intensity gradient and eliminate those with lower intensity gradient within the same contour.

Before an orientation energy gradient (EOG) parameter is computed for a contour, the contour pixel coordinates (x, y) are ordered according to their progression along the contour. This step is utilized because the contour tracing after the video frame segmentation produces contour coordinates (x, y) which are not necessarily ordered according to a natural walk along the contour. For each pixel on a contour, the phase angle is computed according to $$E_p = \arctan(G_y/G_x), \quad (8)$$

where $G_y$ and $G_x$ are computed the same way as they are computed for the NIG parameter of equation (5) above. Next, a value $DE_p = E_p - E_{p-1}$ is computed for each pair of successive contour pixels, and a normalized sum is generated for the entire contour according to $$EOG_c(1/L)\Sigma_p DE_p, \quad (9)$$

where L is the total number of contour pixels. The $EOG_c$ parameters, where c=0, 1, . . . C and C is the contour count in the given video frame, belonging to the set of contours of a segmented frame, are sorted in ascending order while maintaining direct correspondence with respect to the set of contours they belong to. A threshold parameter is introduced in order to select a number of contours with low $EOG_c$. The thresholding parameter producing the number of contours to be discarded, for example, is based on the sum of top EOG values, in ascending order, up to the desired percentage of the total EOG sum for the subject video frame.

While the EOG parameter is in general used to select contours with lower overall change of the pixel phase angles, which represent the orientation of the directional intensity gradient along the pixel contours, it may readily be used on partial traces of any given contour in order to select those traces with lower directional changes within the same contour.

Contours resulting from the video frame segmentation step in process step 212, FIG. 2, are suitably selected based on multiple selection criteria that include, but are not limited to the above described methods. The selected contours will further be described with a shape context descriptor 600, FIG. 6, that will allow for an efficient, compact signature generation on the video frame level.

Although video frame selection can be made with the method described above, the method of selection of a video frame and the segmentation algorithm may be different, without affecting the contour description presented in this section.

Figure 6:
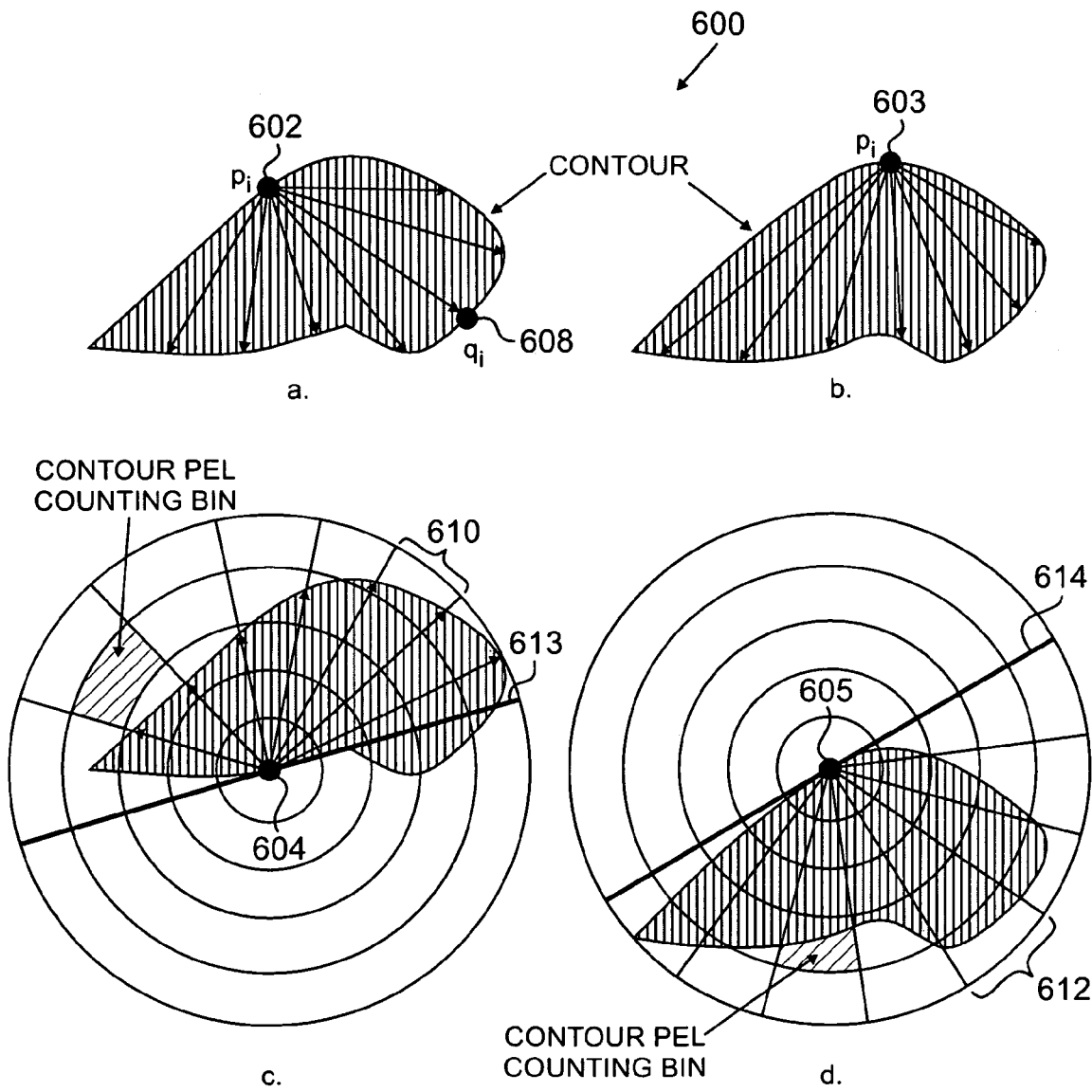
FIG. 6 illustrates an exemplary shape context descriptor based on contour prominent points and the log-polar functional space used to form histogram bins for each selected contour point in accordance with an embodiment of the present invention.

FIG. 6 illustrates a shape context descriptor 600 and indicates the formation of contour point histograms from selected prominent contour points. For a set of, prominent contour points $p_i$ 602-605, a vector originating from each of these points to another point "$q_i$", such as "$q_j$" 608, for example, on the contour is drawn, as shown in FIG. 6. These vectors represent the geometry of the shape relative to the reference prominent points "$p_i$". Next, a distribution of the rest of the contour points pointed by the vectors originating from selected prominent points is captured by a collection of histograms of the relative coordinates of the remaining points with respect to the originating points. The collection of histograms, derived for each prominent contour point, represents the geometry of the shape and a compact signature for each contour is generated, as described below.

For each prominent contour point "$p_i$", a histogram is derived by using bins in a functional space around these contour points which are more sensitive to the immediate neighborhood of the originating point. One example of the functional space used is a log-polar space with a number of bins used in computing the shape context. A multi dimensional signature is generated by weighting and thresholding the number of contour samples falling into the collection bins belonging to all contour prominent points selected as originating reference points.

Further, FIGS. 6A and 6B illustrate a shape/contour and a prominent point "$pi_1$" 602 and "$pi_2$" 603 with vectors drawn to another set of prominent points. In FIGS. 6C and 6D, two examples of the contour point histogram formation are presented using log-polar functional space. From each selected contour point "$pi_3$" 604 and "$pi_4$" 605, five concentric circles are drawn with the radius of the largest ring based on the farthest point on the contour from the selected contour point. Next, based on an angle of the directional gradient computed for the prominent contour points 604 and 605, tangent lines 613 and 614, respectively, are drawn through the selected contour point "$p_i$". The tangent lines 613 and 614 are further used to determine the functional space orientation and which half of the set of concentric circles to use for histogram bin formation. This decision is based on the majority of contour pixels falling on one or the other side of a tangent line. The concentric circles are further divided into sectors, such as sectors 610 and 61(2, as presented in FIGS. 6C and 6D, respectively.

In FIG. 6C, the sectors are formed based on vectors drawn from the selected point to other prominent contour points. In 6d, as an example, a set of eight equidistant sectors are formed. In both, FIGS. 6C and 6D, the bins used for the descriptor derivation are formed as areas bounded by the concentric circles and the sector dividing lines. For each selected contour point, such as "$p_i$," 605, forty bins are formed, for example. In this particular example, if 8 contour points are selected, a total of 8*40=320 bins are generated, since each selected contour point caries its own log-polar functional space with 40 bins. The contour shape descriptor is formed by counting the number of contour pixels falling into each bin and applying a normalized threshold to account for each bin size and to derive a binary value for each bin. In the presented example, which is used for illustrative purpose and by no means reduces the generality of the described method, 320 bits, where each bit corresponds to a single bin, are generated and used as a contour shape descriptor.

To derive an intra-frame feature signature, a set of prominent contours are selected based on the criteria described above, and for each prominent contour a shape descriptor is derived. The set of contour shape descriptors represent a set of feature signatures for the selected video frame.

Figure 7:
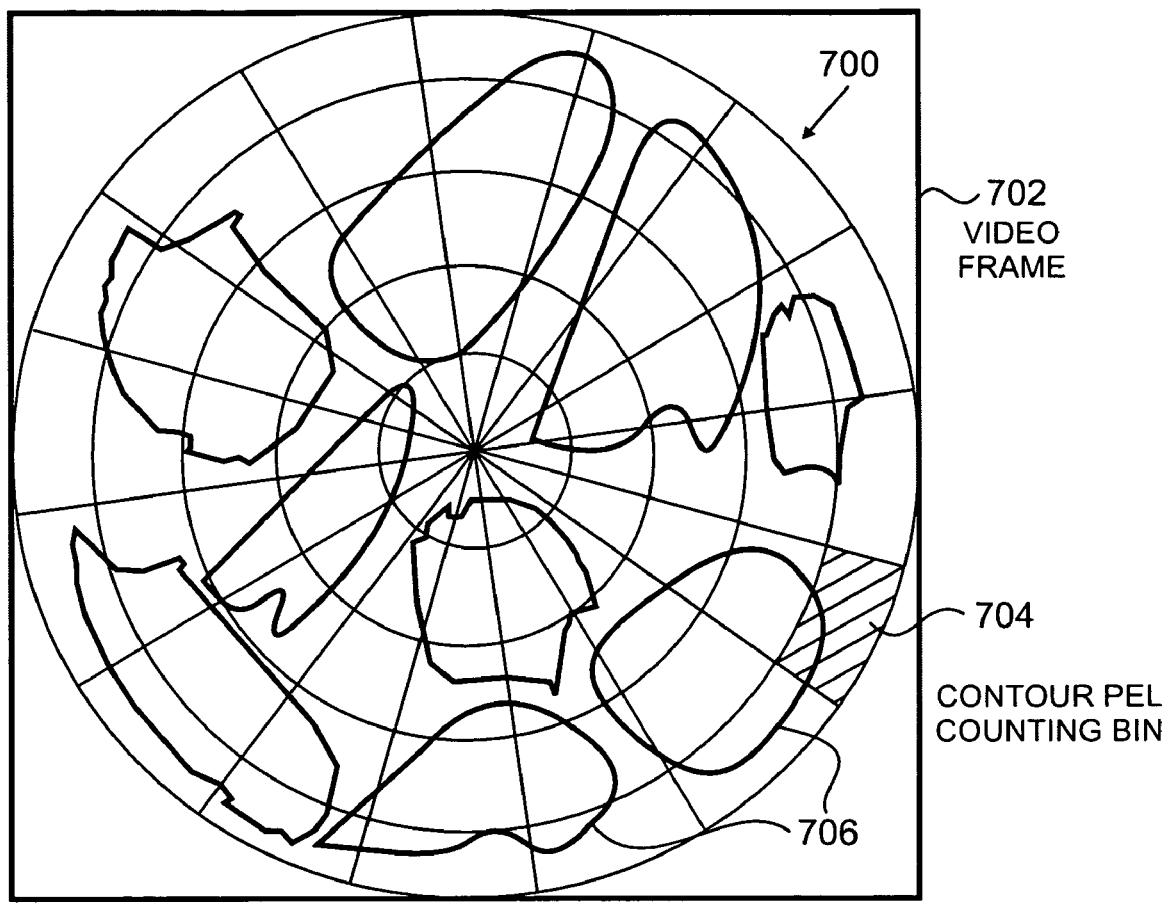
FIG. 7 illustrates an exemplary log-polar functional space inscribed into the video frame active region to form histogram bins for all video frame contours with contour pixels falling in one or more bins in accordance with an embodiment of the present invention.

FIG. 7 illustrates an exemplary log-polar functional space 700 inscribed into the video frame active region to form histogram bins for all video frame contours 706 with contour pixels falling in one or more bins in accordance with an embodiment of the present invention. The functional space used to form counting bins is generated for the entire video frame 702. All contour pixels, falling into sector bins, such as sector bins 704, are weighted based on multiple criteria derived from the contour, or contour trace, properties. A threshold parameter is introduced for each bin to generate a binary value of 0 or 1, depending whether the weighted contour pixel count within a bin is greater than or less than the threshold. The threshold parameter is normalized with respect to the bin area. The set of 0s and 1s corresponding to each bin of the log-polar grid form a multidimensional signature for the particular frame in question.

Figure 8:
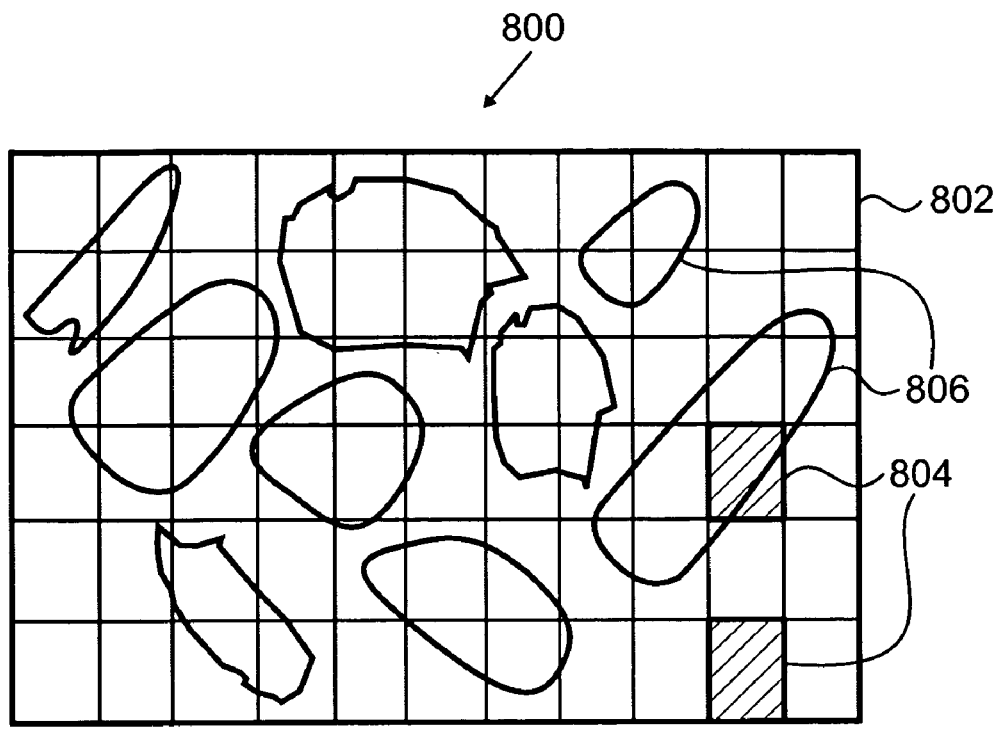
FIG. 8 illustrates an exemplary rectangular functional space inscribed into the video frame active region to form histogram bins used to derive a signature in accordance with an embodiment of the present invention.

FIG. 8 illustrates an exemplary rectangular functional space 800 inscribed into the video frame active region to form histogram bins used to derive a signature in accordance with an embodiment of the present invention. As shown in the rectangular functional space 800, an exemplary rectangular grid 802 is used as the functional space to form histogram bins, such as histogram bins 804, for all video frame contours 806. All contour pixels falling into bins in grid 802 are weighted based on multiple criteria derived from the contour, or contour trace, properties. A threshold parameter is introduced for each bin to generate a binary value of 0 or 1, depending whether the weighted contour pixel count within a bin is greater than or less than the threshold. The threshold parameter is normalized with respect to the bin area. The set of 0s and 1s corresponding to each bin of the rectangular grid form a multidimensional signature for the particular frame in question.

Figure 9:
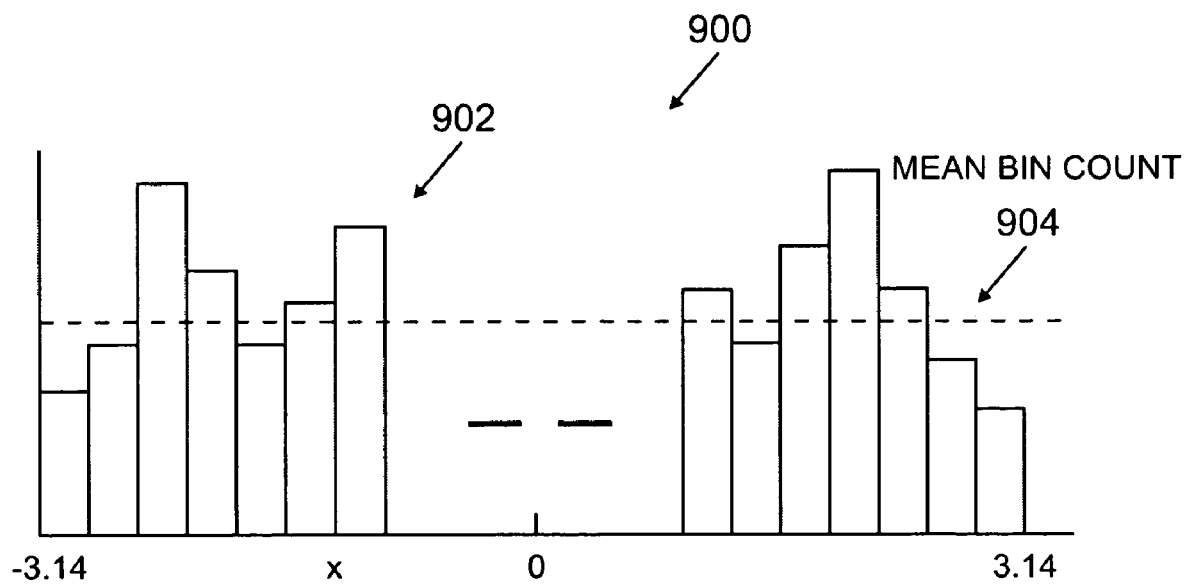
FIG. 9 illustrates an exemplary set of histogram bins containing the count of contour pixel gradient magnitude or orientation values for pixels of all selected video frame contours in accordance with an embodiment of the present invention.

In another embodiment of this invention, as shown for histogram 900 of FIG. 9, an exemplary 1-dimensional set of histogram bins 902 are used to count either the contour pixel gradient magnitude values or the contour pixel gradient phase angle values. A threshold parameter 904 is introduced as the average bin count value to compare against each bin and generate a binary value of 0 or 1, depending whether a bin value is grater or less than the average count 904. The set of 0s and 1s corresponding to each bin of the histogram 900 form a multidimensional signature for the particular frame in question.

The flowchart of FIG. 11 presents processing steps for video sequence preprocessing and feature extraction processing 1100 for frame selection and temporal signature generation as part of process steps 208 and 210 in accordance with an embodiment of the present invention. At step 1101, an input video sequence is received. At step 1102, the video sequence is filtered by a spatial Gaussian filter for noise reduction before it is further processed for active region determination, frame selection in step 1108, and temporal signature generation in step 1110. At step 1104, each video frame is partitioned and $MAD_n$ parameters are computed for the full frame and four frame partitions. At step 1106, temporal statistical functions $f_0(n)$, $f_1(n)$, $f_2(n)$, $f_3(n)$, $f_4(n)$ are derived, where n=0, 1, 2, . . . , N and N is the number of frames in the video sequence, and subsequently all five temporal statistical functions are filtered by a median filter. At step 1108, video frames are selected based on the temporal statistical function $f_0(n)$ derived for the full frame (note that the $f_1(n)$, $f_2(n)$, $f_3(n)$, $f_4(n)$ are derived for four frame partitions such as the partitions 104-1010 of FIG. 10). At step 1109, the output of step 1108 proceeds to frame processing. At step 1110, temporal signatures are generated at selected frame positions based on the temporal statistical functions $f_0(n)$, $f_1(n)$, $f_2(n)$, $f_3(n)$, $f_4(n)$ for full and partitioned frames. At step 1111, the temporal signatures are inserted in a signature library in the video database.

Figure 12:
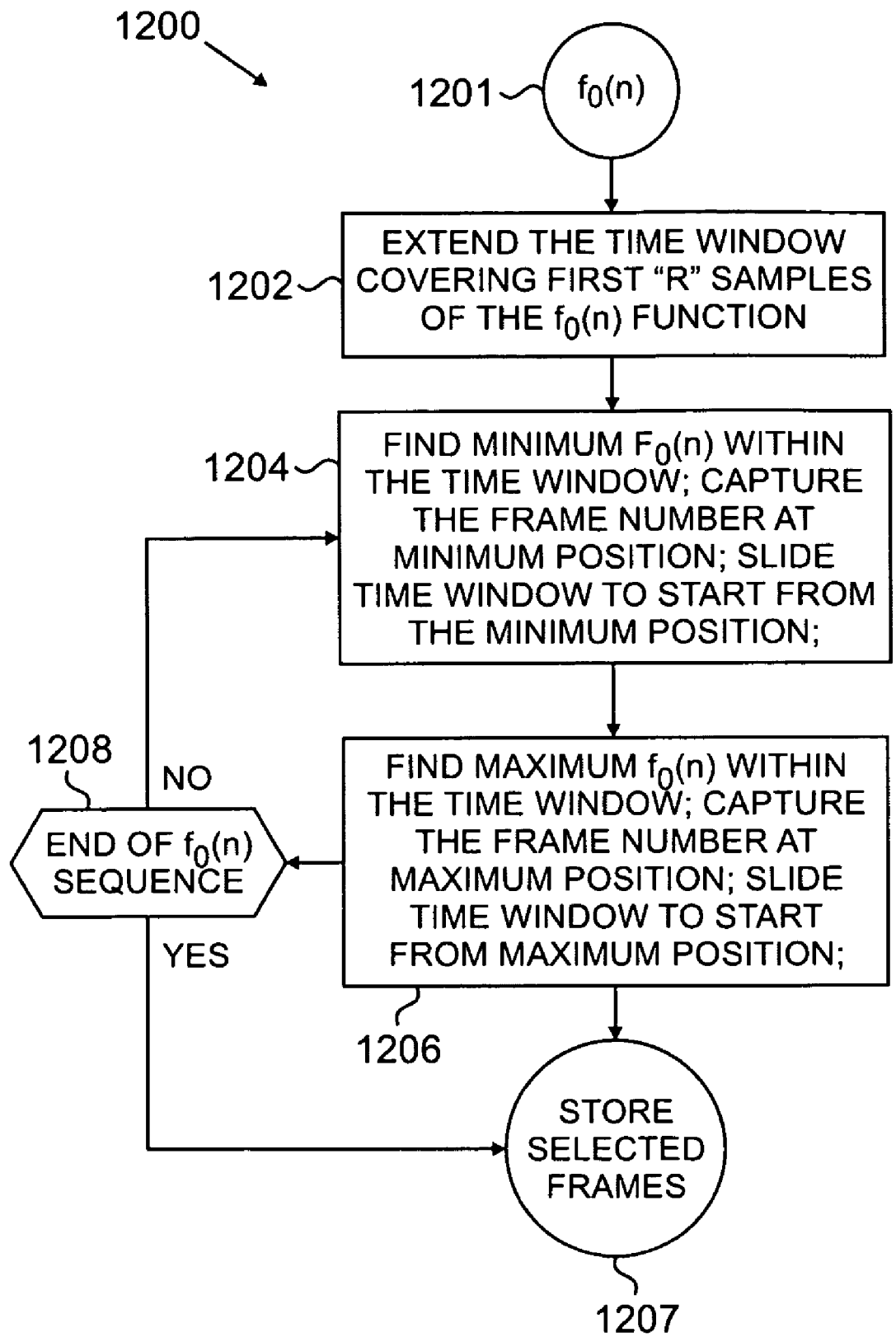
FIG. 12 illustrates a flowchart for video sequence frame selection in accordance with an embodiment of the present invention.

FIG. 12 illustrates a flowchart for a video sequence frame selection process 1200 as part of process step 208 in accordance with an embodiment of the present invention. At step 1201, temporal statistical function $f_0(n)$ is received. At step 1202, the temporal statistical function $f_0(n)$ is used to extend a sliding time window covering first "r" samples of the $f_0(n)$ function. At step 1204 a minimum value of $f_0(n)$ is searched for within the sliding time window and the position of this minimum value on the n ordinate of the $f_0(n)$ function is taken as the selected frame number for this sliding time window. At step 1204, the starting position of the sliding time window is moved to the selected frame (sample) position. At step 1206, a maximum value of $f_0(n)$ is searched for within the sliding time window covering a new set of the $f_0(n)$ samples. The position of this maximum value on the n ordinate of the $f_0(n)$ function represents the selected frame for this new position of the sliding time window. Also, at step 1206, the starting position of the sliding time window is moved to the newly selected frame (sample) position. The position of the maximum represents the selected frame number for this timing window location. At step 1207, the selected frames are stored to be used by processes 1300 and 1400. This process 1200 is continued until the end of $f_0(n)$ is reached as determined at step 1208.

Figure 13:
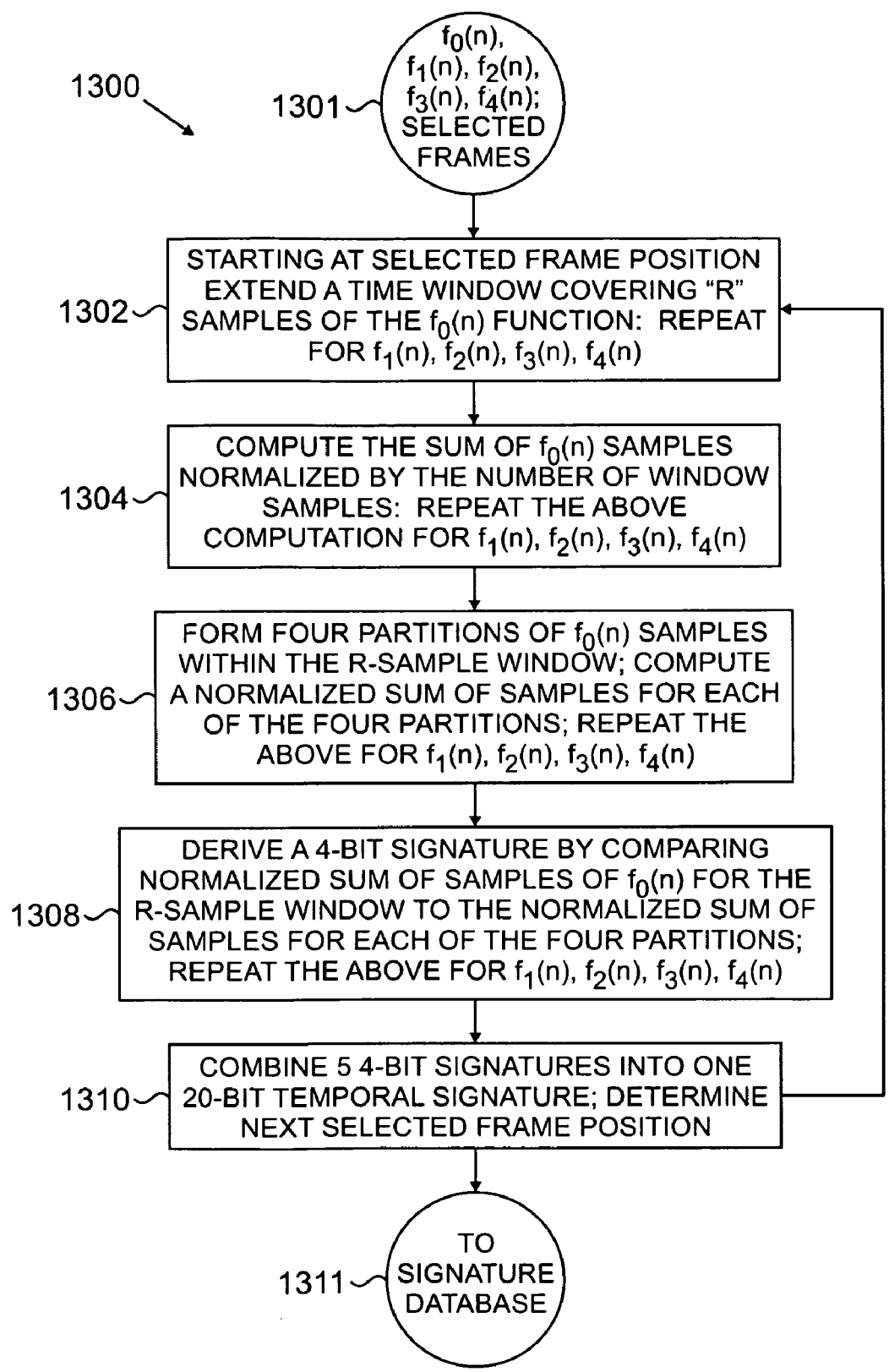
FIG. 13 illustrates a flowchart for temporal signature generation associated with video sequence selected frames in accordance with an embodiment of the present invention.

The flowchart of FIG. 13 illustrates a temporal signature generation process 1300 as part of step 210 associated with video sequence selected frames in accordance with an embodiment of the present invention. At step 1301, the set of temporal statistical functions $f_0(n)$, $f_1(n)$, $f_2(n)$, $f_3(n)$, $f_4(n)$ and the set of selected frame numbers are received and used in the process 1300 to generate 20 bits of the temporal signature for this particular example. At step 1302, the signature generation process 1300 extends a time window starting at selected frame position and covering "r" samples of the $f_0(n)$, $f_1(n)$, $f_2(n)$, $f_3(n)$, and $f_4(n)$ functions. At step 1304, sums of $f_0(n)$, $f_1(n)$, $f_2(n)$, $f_3(n)$, and $f_4(n)$ samples are computed and normalized by the number of time window samples. At step 1306, four partitions of $f_0(n)$ samples within the r-sample time window are formed and a normalized sum of samples for each of the four partitions is computed. This process is repeated for $f_1(n)$, $f_2(n)$, $f_3(n)$, $f_4(n)$ functions. At step 1308, a 4-bit signature is derived by comparing a normalized sum of samples of $f_0(n)$ for the r-sample timing window to a normalized sum of samples for each of the four time partitions. This process at step 1308 is repeated for $f_1(n)$, $f_2(n)$, $f_3(n)$, $f_4(n)$ to derive an additional four 4-bit signatures associated with each spatial video frame partition. At step 1310, the five 4-bit signatures are combined into one 20-bit temporal signature. At step 1311 the 20-bit temporal signature is inserted into the signature library in the video database. This process 1300 is repeated until all selected frame numbers are processed.

Figure 14:
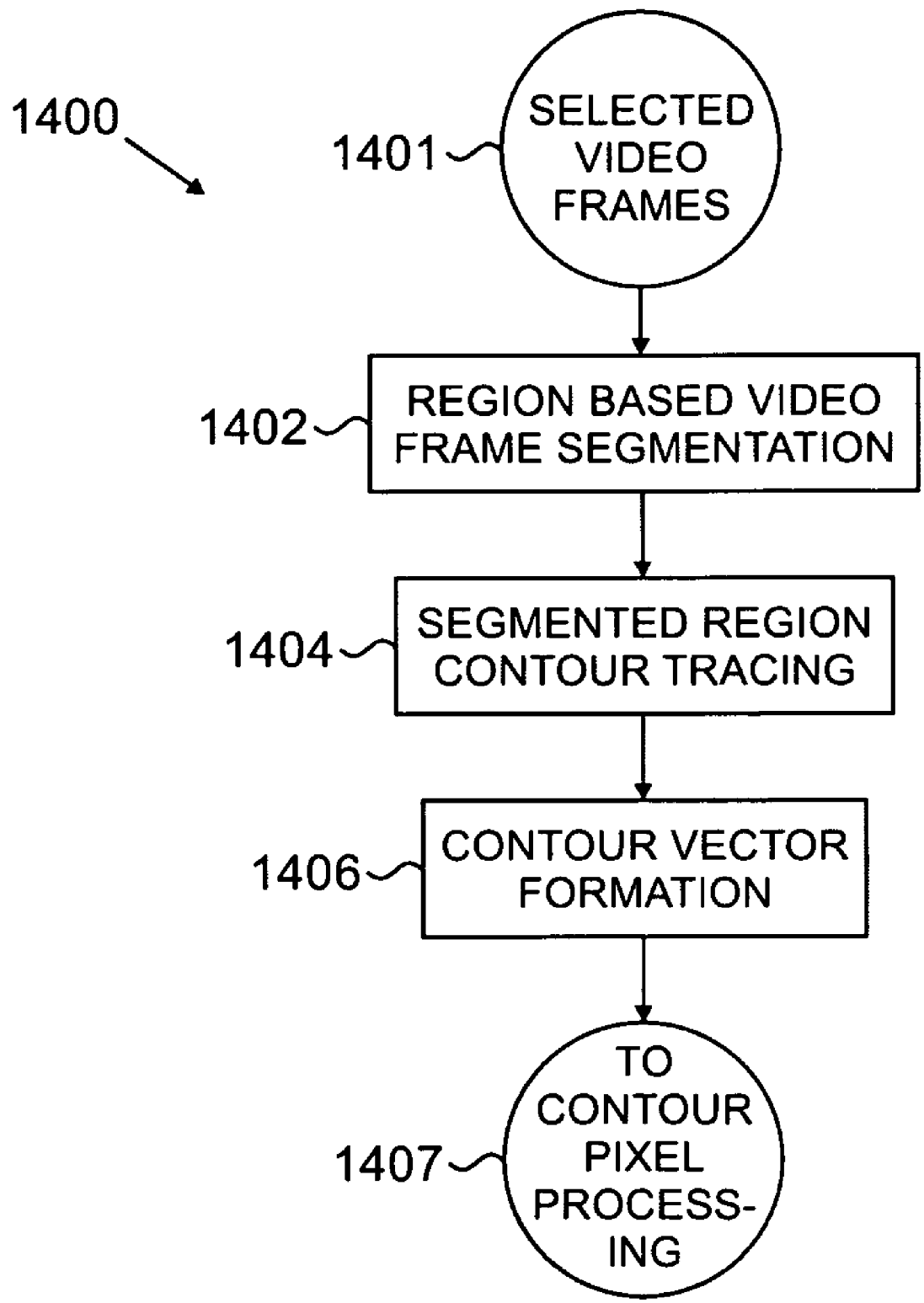
FIG. 14 illustrates a flowchart for segmentation of selected video frames and contour pixel vector generation in accordance with an embodiment of the present invention.

FIG. 14 illustrates a flowchart for a segmentation of selected video frame and contour pixel vector generation process 1400 as part of step 212 in accordance with an embodiment of the present invention. At step 1401 selected video frames 206 are received from 1109. At step 1402, every individual video frame is subjected to region based segmentation. At step 1404, the output regions of step 1402 are traced. At step 1406, a contour vector of (x, y) coordinates is formed for each closed contour that represents a perimeter of a region. At step 1407, the contour vectors are passed to the contour pixel processing in step 1501 of FIG. 15.

Figure 15:
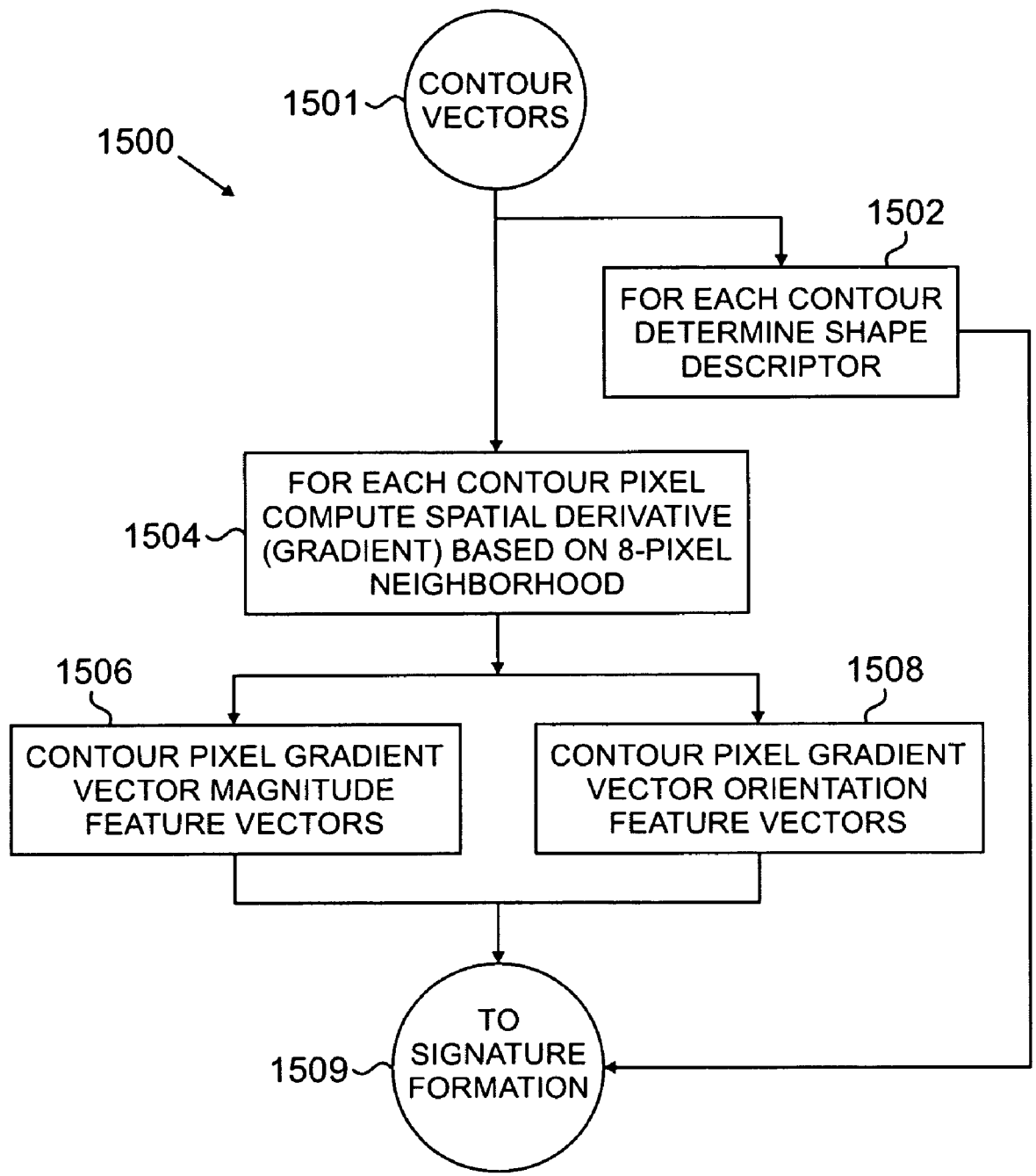
FIG. 15 illustrates a flowchart for contour vector processing to derive a contour pixel gradient magnitude and an orientation and contour shape descriptor in accordance with an embodiment of the present invention.

FIG. 15 illustrates a flowchart for a contour vector process 1500 to derive a contour pixel gradient magnitude and an orientation and contour shape descriptor as part of process step 212 in accordance with an embodiment of the present invention. At step 1501, contour vectors for each contour are received. At step 1502, the contour vectors are processed to derive shape descriptors. At step 1504, a spatial derivative (gradient) is computed based on an S-pixel neighborhood for each contour pixel. At step 1506, a contour pixel gradient vector magnitude is computed. At step 1508, a contour pixel gradient vector orientation is computed. At step 1509, the contour pixel gradient vector magnitude, the contour pixel gradient vector orientation, and the contour shape descriptors are passed to step 1601 of signature generation process 1600.

Figure 16:
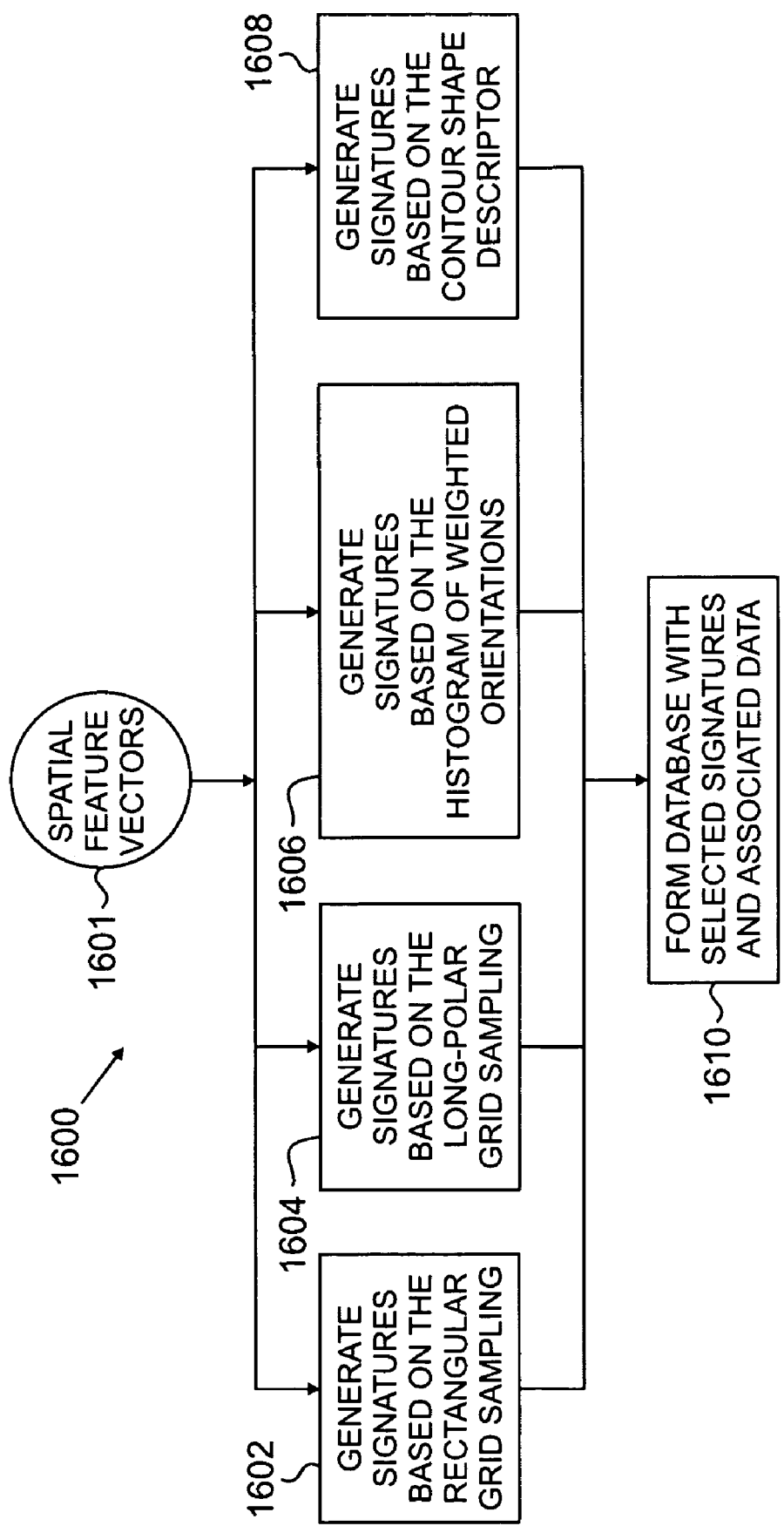
FIG. 16 illustrates a flowchart for signature generation and signature database formation in accordance with an embodiment of the present invention.

FIG. 16 illustrates a flowchart for the signature generation process 1600 as part of step 214 and signature database formation in accordance with an embodiment of the present invention. At step 1601, the spatial video feature vectors are received from 1509, including contour pixel gradient vector magnitude, contour pixel gradient vector orientation, and the contour shape descriptors, as a plurality of video frame feature vectors to be utilized in a plurality of the signature generation processes. For example, at step 1602, multi-dimensional signatures are generated based on a rectangular grid sampling. At step 1604 multi-dimensional signatures are generated based on a log-polar grid sampling. At step 1606, multi-dimensional signatures are generated based on a histogram of weighted orientations and gradient magnitudes. At step 1608, multi-dimensional signatures are generated based on the contour shape descriptors. At step 1610, a video database is formed with a set of selected signatures stored in a signature library and associated data.

FIG. 17 illustrates a flowchart for a signature database query process 1700 as part of step 216 and matching video sequence determination in accordance with an embodiment of the present invention. At step 1701, a set of signatures representing a query video sequence is received. At step 1702, a multidimensional similarity search is performed with each query signature to determine a set of matching signatures in the video database which are in the neighborhood of the query. At step 1704, a list of matching candidate signatures is generated. At step 1706, probable sequences of matching candidates with linear temporal dependence are generated. At step 1708, the most probable matching video sequence is determined based on a set of distance measures. At step 1709, the most probable matching video sequence is presented as a search result.

Upon reading this disclosure, those of skill in the art will appreciate still additional alternative systems and methods for a scalable identification of digital video sequences in accordance with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

We claim:

1. A method for content based video sequence identification comprising:
  determining active regions in frames of a video sequence;
  selecting a set of video frames in response to temporal statistical characteristics of the determined active regions;
  extracting video features of the selected video frames;
  generating multi-dimensional content based signatures based on the extracted video features that identify the video sequence;
  weighting pixel bins with multiple parameters dependent on pixel characteristics with respect to the surrounding area laid out as a log-polar functional space inscribed into the determined active regions of the selected video frames to form histogram bins for all video frame contours;

normalizing a pixel count for each histogram bin according to the weights and according to histogram bin area; and applying a threshold function to generate a binary signature with a number of bits corresponding to the number of bins.

2. The method of claim 1 wherein the step of determining active regions in frames comprises:

filtering the video sequence to reduce noise; and analyzing frames of the video sequence to isolate the active regions in the frames.

3. The method of claim 1 wherein the step of generating multi-dimensional content based signatures comprises:

counting contour pixels falling into selected bins in a log-polar space based on a shape context description; and applying a threshold to assign a 0 or 1 to each bin in the selected collection of bins.

4. The method of claim 1 further comprising:

segmenting selected video frames utilizing selected active frame areas into a plurality of regions, each region delineated by the video frame contours; and inscribing a log-polar functional space into the plurality of regions to form histogram bins that cover the video frame contours.

5. The method of claim 1 further comprising:

forming a content based video database to hold the multi-dimensional content based signatures.

6. A method for content based video sequence identification comprising:

determining active regions in frames of a video sequence;

selecting a set of video frames in response to temporal statistical characteristics of the determined active regions;

extracting video features of the selected video frames;

generating multi-dimensional content based signatures based on the extracted video features that identify the video sequence;

weighting pixel bins with multiple parameters dependent on pixel characteristics with respect to the surrounding area laid out as a rectangular functional space inscribed into an entire video frame to form histogram bins for all video frame contours;

normalizing a pixel count for each histogram bin according to the weights and according to histogram bin area; and applying a threshold function to generate a binary signature with a number of bits corresponding to the number of bins.

7. The method of claim 6 wherein the step of selecting a set of video frames comprises:

generating a temporal statistical function for a video sequence based on mean absolute value difference (MAD) parameters computed for corresponding pixels in two successive video sequence frames.

8. The method of claim 7 further comprising:

filtering the temporal statistic function corresponding to a normalized array of the MAD parameter values with a median filter to suppress excessive peaks due to abrupt scene changes and to suppress very low values due to undesired video frame repetitions.

9. The method of claim 6 further comprising:

determining active regions in frames of a query video sequence;

selecting a set of query video frames in response to temporal statistical characteristics of the determined active regions;

extracting query video features of the selected query video frames;

generating multi-dimensional content based signatures based on the extracted query video features that identify the query video sequence; and searching the video database for a match between the query video multi-dimensional content based signatures and signatures stored in the video database.

10. The method of claim 6 further comprising:

segmenting selected video frames utilizing selected active frame areas into a plurality of regions, each region delineated by the video frame contours; and inscribing a rectangular functional space into the plurality of regions to form histogram bins that cover the video frame contours.

11. The method of claim 6 further comprising:

forming a content based video database to hold the multi-dimensional content based signatures.

12. A method for content based video sequence identification comprising:

determining active regions in frames of a video sequence;

selecting a set of video frames in response to temporal statistical characteristics of the determined active regions;

extracting video features of the selected video frames;

generating multi-dimensional content based signatures based on the extracted video features that identify the video sequence;

generating histograms containing a count of contour pixel gradient magnitude for pixels of selected video frame contours;

applying a histogram average bin count as a threshold parameter to generate a binary signature; and generating the binary signature by comparing each histogram bin value with the threshold parameter, assigning a zero value depending on whether a histogram bin count is less than the threshold parameter, assigning a one value depending on whether a histogram bin count is greater than the threshold parameter, a number of signature bits corresponding to the number of bins of the histogram.

13. The method of claim 12 wherein the step of extracting video features comprises:

segmenting the active video frame into areas of similar light intensity and color;

determining the perimeter of the segmented areas which represent closed contours; and tracing the contours to produce a vector of contiguous spatial coordinates (x, y) for each pixel on the contour.

14. The method of claim 12 further comprising:

segmenting selected video frames utilizing selected active frame areas into a plurality of regions, each region delineated by the selected video frame contours; and forming a content based video database to hold the multi-dimensional content based signatures.

15. A method for content based video sequence identification comprising:

determining active regions in frames of a video sequence;

selecting a set of video frames in response to temporal statistical characteristics of the determined active regions;

extracting video features of the selected video frames;

generating multi-dimensional content based signatures based on the extracted video features that identify the video sequence;

generating histograms containing a count of contour pixel gradient orientation values for pixels of all selected video frame contours;

applying a histogram average bin count as a threshold parameter to generate a binary signature; and generating the binary signature by comparing each histogram bin value with the threshold parameter, assigning a zero value depending on whether a histogram bin count is less than the threshold parameter, assigning a one value depending on whether a histogram bin count is greater than the threshold parameter, a number of signature bits corresponding to the number of bins of the histogram.

16. The method of claim 15 wherein the step of generating multi-dimensional content based signatures comprises:

deriving a T-bit signature for each video frame partition and each time window with K frames by comparing $MN_{qi}=\Sigma fq(n)/F$ values for the particular time window to the corresponding partition values $MPN_{pk}$, and a 0 or 1 assigned depending whether the particular $MN_{qi}$, value is greater than or less than the corresponding $MPN_{pk}$.

17. The method of claim 16 further comprising:

computing a collection of S T-bit values for each video frame partition and a κ-frame time window; and combining the computed collection of S T-bits into an N-bit signature to be attached to the selected frame κ for this window.

18. The method of claim 15 wherein the step of generating multi-dimensional content based signatures comprises:

deriving a T-bit signature for the full video frame and each time window with K frames based on function $f_0(n)$.

19. The method of claim 15 further comprising:

segmenting selected video frames utilizing selected active frame areas into a plurality of regions, each region delineated by the selected video frame contours; and forming a content based video database to hold the multi-dimensional content based signatures.

* * * * *